Sept. 11, 1923.

J. F. GRAHAM

PET COCK

Filed Feb. 7, 1921

1,467,932

Joseph F. Graham
INVENTOR

BY Victor J. Evans
ATTORNEY

WITNESS:

Patented Sept. 11, 1923.

1,467,932

UNITED STATES PATENT OFFICE.

JOSEPH F. GRAHAM, OF TUNNELTON, WEST VIRGINIA.

PET COCK.

Application filed February 7, 1921. Serial No. 443,121.

*To all whom it may concern:*

Be it known that I, JOSEPH F. GRAHAM, a citizen of the United States, residing at Tunnelton, in the county of Preston and State of West Virginia, have invented new and useful Improvements in Pet Cocks, of which the following is a specification.

This invention relates to improvements in pet cocks especially designed for priming the cylinders of hydro-carbon engines.

An object of the invention is the provision of a pet cock in which the passage is closed at each end, thereby preventing the formation of carbon within the inner end of said passage and the accumulation of dust and dirt within the opposite end.

Another object of the invention is the provision of means whereby the opening and closing of each end of the passage is simultaneously effected, provision being made whereby, when the outer end of the passage is open, the inner end will be also open to permit of the passage of a priming charge and when the outer end is closed, the inner end will be also closed for the purpose above stated.

With the above and other objects in view, the invention also includes the following novel features and details of construction, to be hereinafter more fully described, illustrated in the accompanying drawings and pointed out in the appended claims.

In the drawings:—

Figure 1:
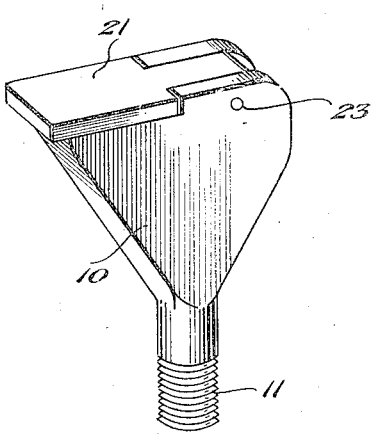
Figure 1 is a perspective view of the pet cock.
Figure 2:
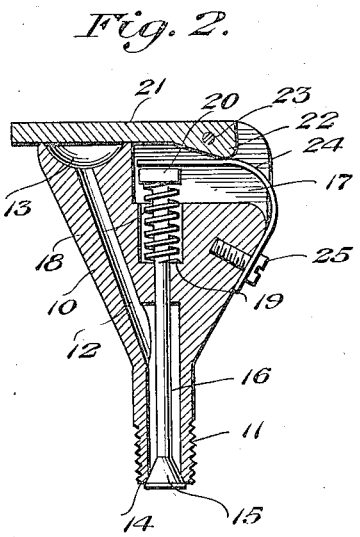
Figure 2 is a central vertical sectional view of the same showing the passage closed.
Figure 3:
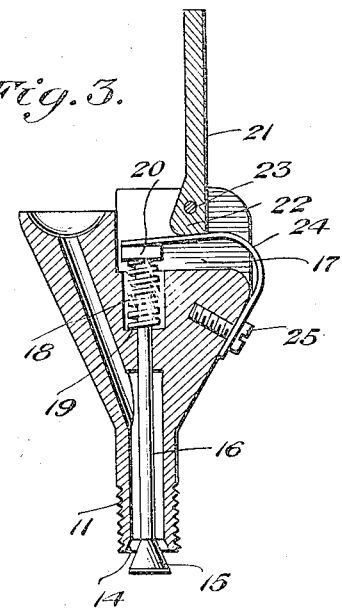
Figure 3 is a similar view with the passage open.

Referring in detail to the drawings, wherein like characters of reference denote corresponding parts, the pet cock as herein illustrated comprises a casing 10 of suitable shape and size, having a tubular threaded extension 11 for the purpose of securing the device in position, for example in the cylinder head of an engine.

Extending from the casing 10 is a passage 12, the said passage extending from the upper end of the casing and adapted to communicate with the tubular extension 11, the upper end of this passage communicating with a chamber 13, while at its lower end the tubular extension is formed with a seat 14 for the valve member 15. This valve member is secured to a valve stem 16 which extends upwardly through the casing and has its upper end projecting into a recess 17 formed in the casing 10. The valve member 15 is normally seated to close the lower end of the tubular extension by means of a spring 18, the latter bearing against a shoulder 19 at one end and at its opposite end against a head 20 which is carried by that portion of the stem 16 which projects into the recess 17.

The outer end of the passage 12 is closed by a closure member 21, which is provided with a cam extension 22 having a pivotal mounting within the recess 17 as shown at 23. The closure member 21 is designed to normally overlie the top of the chamber 13 and thus close the upper end of the passage 12. For the purpose of yieldingly holding this closure member 21 in its closed position, there is provided a leaf spring 24, one end of which is secured to the valve casing as shown at 25 while the opposite end extends inwardly for contact with the head 20 of the valve stem 16, the cam projection 22 being in contacting engagement with this spring.

In the operation of the device, the closure member 21 may be lifted or swung upwardly upon its pivot 23 so as to uncover the chamber 13 and consequently the upper end of the passage 12, the said closure member 21 projecting slightly beyond the edge of the casing to aid in this operation. As the member 21 is raised, the cam extension 22 will bear downward upon the spring 24 and cause the inner end of the latter to force the valve 15 downwardly away from its seat 14 against the action of the spring 18, the engagement of the cam extension 22 with the spring 24 serving to hold the closure member 21 against accidental closing. As soon as the member 21 is manually closed, the pressure of the inner end of the spring will be released from the head 20 of the valve 15, whereupon the latter will be seated under the influence of the spring 18, thus simultaneously closing the passages of the casing at each end.

The invention is susceptible of various changes in its form, proportions and minor details of construction and the right is herein reserved to make such changes as properly fall within the scope of the appended claim.

Having described the invention what is claimed is:—

A pet cock of the character described comprising a casing, a tubular extension depending therefrom and being terminally provided with an inwardly extending seat, a semi-circular chamber formed in the upper surface of the casing adjacent one edge and being in communication with the tubular extension through the medium of an angularly disposed passage, said casing having a recess extending inwardly from the edge opposite the edge within which the semi-circular chamber is formed and being designed to provide shoulders in its bottom wall, a valve stem extending upwardly through the casing and having a portion arranged in the tubular extension and its opposite end extending into said recess, a valve member secured to the stem and adapted to normally engage the seat and close the lower end of the tubular extension, a head secured to the stem and arranged in said recess, a coil spring surrounding the stem at its headed end and having its end convolutions engaging the shoulders and head respectively for holding the valve member against said seat, a leaf spring secured at one end of the casing and having its opposite end in contacting engagement with said head as and for the purpose specified.

In testimony whereof I affix my signature.

JOSEPH F. GRAHAM.